(12) United States Patent
Nie et al.

(10) Patent No.: US 10,893,500 B2
(45) Date of Patent: Jan. 12, 2021

(54) METHODS AND APPARATUSES FOR DETECTING POSITION CHANGE OF AN ACCESS POINT

(71) Applicant: BEIJING DIDI INFINITY TECHNOLOGY AND DEVELOPMENT CO., LTD., Beijing (CN)

(72) Inventors: Xianglong Nie, Beijing (CN); Weihuan Shu, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 16/529,896

(22) Filed: Aug. 2, 2019

(65) Prior Publication Data

US 2019/0357168 A1 Nov. 21, 2019

Related U.S. Application Data

(63) Continuation of application No. PCT/CN2017/089224, filed on Jun. 20, 2017.

(51) Int. Cl.
*H04W 64/00* (2009.01)
*H04W 4/029* (2018.01)

(52) U.S. Cl.
CPC ........ *H04W 64/003* (2013.01); *H04W 4/029* (2018.02)

(58) Field of Classification Search
CPC ... H04W 64/00; H04W 4/029; H04W 64/003; H04W 84/12; H04W 88/08; H04W 24/02; H04W 84/045; H04W 16/18; H04W 36/0061; H04W 36/0083; H04W 56/0015; H04W 28/021; H04W 40/20;
(Continued)

(56) References Cited

U.S. PATENT DOCUMENTS

2006/0217131 A1* 9/2006 Alizadeh-Shabdiz .... G01S 5/02
455/456.1
2008/0085699 A1* 4/2008 Hirano ................ H04W 64/003
455/414.2
(Continued)

FOREIGN PATENT DOCUMENTS

CN 101180836 A 5/2008
CN 103796302 A 5/2014
(Continued)

OTHER PUBLICATIONS

US 9,516,465, 12/2016, Drop, Inc. (withdrawn).
(Continued)

*Primary Examiner* — Daniel Lai
(74) *Attorney, Agent, or Firm* — Finnegan, Henderson, Farabow, Garrett & Dunner, L.L.P.

(57) ABSTRACT

The present disclosure relates to a method and apparatus for detecting position change of an access point. According to certain embodiments, the method includes: obtaining a list of access stations scanned by a terminal device, wherein the list of scanned access stations includes the access point; and detecting the position change of the access point when the list of scanned access stations does not include a reference access station in association with the access point.

20 Claims, 4 Drawing Sheets

(58) Field of Classification Search
CPC . H04W 84/047; H04W 84/10; H04W 88/085; H04W 88/12; H04W 16/00; H04W 8/005; H04W 48/20
See application file for complete search history.

(56) References Cited

U.S. PATENT DOCUMENTS

| | | | |
|---|---|---|---|
| 2014/0036701 A1* | 2/2014 | Gao | H04W 48/20 370/252 |
| 2015/0223145 A1* | 8/2015 | Yoon | H04W 48/04 370/328 |
| 2015/0358902 A1 | 12/2015 | Edge | |
| 2016/0007358 A1 | 1/2016 | Yanagisawa et al. | |
| 2020/0045665 A1* | 2/2020 | Kuang | H04B 17/318 |

FOREIGN PATENT DOCUMENTS

| | | |
|---|---|---|
| CN | 105491529 A | 4/2016 |
| CN | 106358228 A | 1/2017 |
| CN | 106507445 A | 3/2017 |
| WO | 2010105513 A1 | 9/2010 |

OTHER PUBLICATIONS

International Search Report in PCT/CN2017/089224 dated Feb. 24, 2018, 4 pages.
Written Opinion in PCT/CN2017/098224 dated Feb. 24, 2018, 4 pages.

* cited by examiner

METHODS AND APPARATUSES FOR DETECTING POSITION CHANGE OF AN ACCESS POINT

TECHNICAL FIELD

The present disclosure relates to positioning technology, and more particularly, to methods and apparatuses for detecting position change of an access point.

BACKGROUND

A WI-FI terminal device may acquire its position by referring to a position of a WI-FI access point (AP) that the terminal device connects to. For example, a smartphone may acquire its position by referring to a position of a WI-FI AP that the smartphone currently connects to. The smartphone may query the position of the connected WI-FI AP by sending the Media Access Control (MAC) address of the WI-FI AP to a WI-FI AP position server. The WI-FI AP position server may include a database of WI-FI AP positions that contains correspondence between WI-FI AP's MAC addresses and their Global Positioning System (GPS) positions, and return to the smartphone a GPS position corresponding to the MAC address of the connected WI-FI AP. After receiving the GPS position of the connected WI-FI AP, the smartphone may determine its current position based on the received position of the connected WI-FI AP. For example, position of a WI-FI AP near the smartphone is usually adopted as the smartphone position.

As such, the WI-FI AP positions need to be scanned in advance to compile the databases. However, occasionally WI-FI APs may be relocated to new positions due to, for example, building constructions, office or home relocations, etc. If the new position of a relocated WI-FI AP is not timely updated in the databases, a terminal device connecting to the relocated WI-FI AP may still rely on the WI-FI AP's old position, which may cause positioning errors. For example, a WI-FI AP may be recently relocated from Boston to New York city, the relocation, if not timely updated in the databases, may cause a terminal device connecting to the WI-FI AP to be erroneously positioned at Boston. Thus, it would be desirable to have a method or apparatus for detecting position change of an access point in a timely manner.

Embodiments of the disclosure provide methods and apparatuses for detecting position change of an access point, which improve positioning accuracy of a terminal device.

SUMMARY

One aspect of the present disclosure is directed to a computer-implemented method for detecting position change of an access point. The method includes: obtaining a list of access stations scanned by a terminal device, wherein the list of scanned access stations includes the access point; and detecting the position change of the access point when the list of scanned access station does not include a reference access station in association with the access point.

Another aspect of the present disclosure is directed to a device for detecting position change of an access point. The device includes a memory including instructions. The device also includes at least one processor configured to execute the instructions to: obtain a list of access stations scanned by a terminal device, wherein the list of scanned access stations includes the access point; and detect the position change of the access point when the list of scanned access station does not include a reference access station in association with the access point.

Yet another aspect of the present disclosure is directed to a non-transitory computer-readable medium that stores a set of instructions, when executed by at least one processor, cause the at least one processor to perform a method for detecting position change of an access point. The method includes: obtaining a list of access stations scanned by a terminal device, wherein the list of scanned access stations includes the access point; and detecting the position change of the access point when the list of scanned access station does not include a reference access station in association with the access point.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

The disclosure is generally directed to methods and apparatuses for detecting position change of a WI-FI AP. In some embodiments, the method may include scanning for access stations around a terminal device. The method may also include obtaining a list of scanned access stations. The terminal device may connect to an access point in the list of scanned access stations. The method may further include detecting the position change of the connected access point when the list of scanned access station does not include a reference access station. The access point may be in association with the reference access station.

In some embodiments, the association between the scanned and the reference access stations may be established when historical data showing geographic distributions of wireless devices in a specific area indicates the access point and the reference access station co-exists in the same specific area. In some embodiments, the association may be established when the access point and the reference access station use the same service set identifier (SSID). In some embodiments, the association may be established when the MAC addresses of both the access point and the reference access station belong to a predetermined group of MAC addresses.

In some embodiments, the method may further include obtaining an estimated position of the terminal device. In addition, the method may include obtaining a position of the access point from a server. Moreover, the method may include detecting the position change of the access point when the estimated position of the terminal device and the received position of the access point are not within a predetermined distance. In some embodiments, the method may further include disregarding the access point in positioning the terminal device when the position change of the access point is detected. In some embodiments, the method may further include sending the estimated position of the terminal device and identity of the access point to the server.

Figure 1:
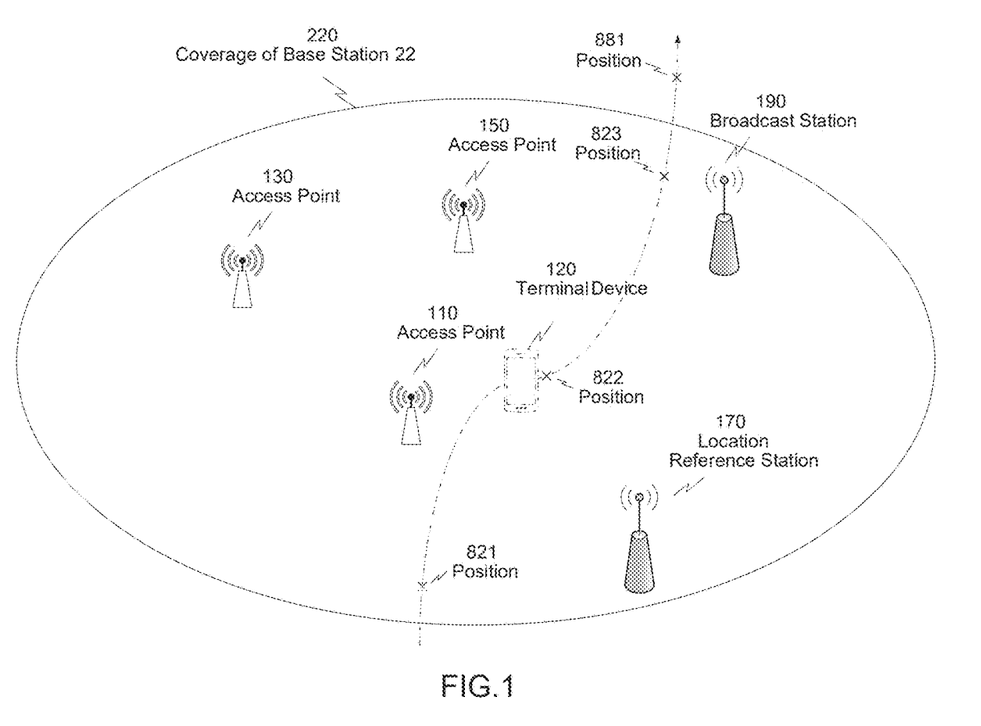
FIG. 1 illustrates an exemplary deployment of access stations, according to some embodiments of the disclosure.

FIG. 1 illustrates an exemplary deployment of access stations, according to some embodiments of the disclosure. As used in the present disclosure, an access station is a station that provides access to a network, information, or data. For example, an access station may be a cellular base station, a femto access point, an access point of a wireless local area network (WLAN), a location reference station, a broadcast station, a network access node, or a transmission apparatus that may transmit information or data. In the disclosed embodiments, one or more access stations may be deployed at or around a position of interest. When a device can access information or data from the one or more access stations, the device may use the positions of the one or more access stations to determine the position of interest. In some embodiments, an access station, e.g., a femto access point or an access point of a WLAN, may be initially deployed at or around the position of interest but later moved away from the position of interest. As such, to ensure the accuracy of determining the position of interest, it is desirable for the device to timely detect the relocation and not to rely on the relocated access station to determine the position of interest.

Referring to FIG. 1, a terminal device 120 may move to a position 822. Terminal device 120 may be a smartphone that includes a cellular communication module, such as a Long-Term Evolution (LTE), High Speed Packet Access (HSPA), Wideband Code-Division Multiple Access (WCDMA), or Global System for Mobile communication (GSM) communication module. Terminal device 120 at position 822 may scan and detect a cellular base station 22 (not shown) by using its cellular communication module if terminal device 120 at position 822 is within coverage 220 of base station 22. Terminal device 120 may also include a wireless local area network (WLAN) module, such as a WI-FI communication module. Through the WI-FI communication module, terminal device 120 at position 822 may scan and detect WI-FI APs 110, 130, 150. Accordingly, terminal device 120 at position 822 may scan for access stations around itself and obtain a list of scanned access stations, including base station 22 and WI-FI APs 110, 130, 150.

In some embodiments, terminal device 120 may further include a location reference communication module that may scan location reference stations and use their positions as references. Through the location reference communication module, terminal device 120 at position 822 may scan and detect location reference station 170. Accordingly, terminal device 120 at position 822 may scan for access stations around itself and obtain a list of scanned access stations, including base station 22, WI-FI APs 110, 130, 150, and location reference station 170.

In some embodiments, terminal device 120 may further include a broadcast communication module that may scan broadcast stations, such as local radios by Frequency Modulation (FM) or Amplitude Modulation (AM) broadcasting. Through the broadcast communication module, terminal device 120 at position 822 may scan and detect broadcast station 190. Accordingly, terminal device 120 at position 822 may scan for access stations around itself and obtain a list of scanned access stations, including base station 22, WI-FI APs 110, 130, 150, location reference station 170, and broadcast station 190.

In some embodiments, when terminal device 120 moves to position 821, it may scan for access stations nearby and obtain a list of scanned access stations, including, e.g., base station 22, WI-FI AP 110, and location reference station 170. In other words, terminal device 120 at position 821 may no longer have WI-FI APs 130, 150, and broadcast station 190 on its list of scanned access stations, as compared to that at position 822. In some embodiments, when terminal device 120 moves to position 823, it may scan for access stations nearby and obtain a list of scanned access stations, including base station 22, WI-FI AP 150, and broadcast station 190. In other words, terminal device 120 at position 823 may no longer have WI-FI APs 110, 130 and location reference station 170 on its list of scanned access stations, as compared to that at position 822.

When terminal device 120 locates at position 822, it may select one or more access stations from the list of scanned access stations and connect to. For example, terminal device 120 at position 822 may select and connect to WI-FI AP 110 because WI-FI AP 110 is accessible and provides the best communication signals. After connecting to WI-FI AP 110, terminal device 120 may obtain the MAC address of WI-FI AP 110. When terminal device 120 needs to position itself, it may send the MAC address of WI-FI AP 110 to a WI-FI AP position server (not shown) and query the position of WI-FI AP 110. The WI-FI AP position server may include a database of WI-FI AP positions and the database may include correspondence between WI-FI APs' MAC addresses and their GPS positions. After receiving the MAC address of WI-FI AP 110, the server may search its database and return a GPS position corresponding to the received MAC address of WI-FI AP 110. Terminal device 120 may use the received GPS position of WI-FI AP 110 for some location based services (LBSs) or applications, such as determining the current position of terminal device 120.

In some embodiments, terminal device 120 may establish association between an access point and a reference access station. For example, terminal device 120 may establish association between WI-FI AP 110 and base station 22 when WI-FI AP 110 and base station 22 are both scanned at position 822 or 821. In this case, cellular base station 22 may be a reference access station for WI-FI AP 110. When terminal device 120 intends to adopt the position of WI-FI AP 110 to determine the current position of terminal device 120, terminal device 120 may check whether WI-FI AP 110 and base station 22 are both scanned. For example, terminal device 120 at position 822 may scan and obtain a list of scanned access stations, including base station 22, WI-FI APs 110, 130, 150, location reference station 170, and broadcast station 190. According to the established association between WI-FI AP 110 and base station 22, terminal device 120 may check whether WI-FI AP 110 and base station 22 are both included in the list of scanned access stations. If the list includes both WI-FT AP 110 and base station 22, terminal device 120 may detect no position change of WI-FI AP 110. Terminal device 120 may then proceed to obtain the GPS position of WI-FI AP 110 from the server, for determining the position of terminal device 120. The operations are similar to those described above, which are not repeated herein.

Figure 2:
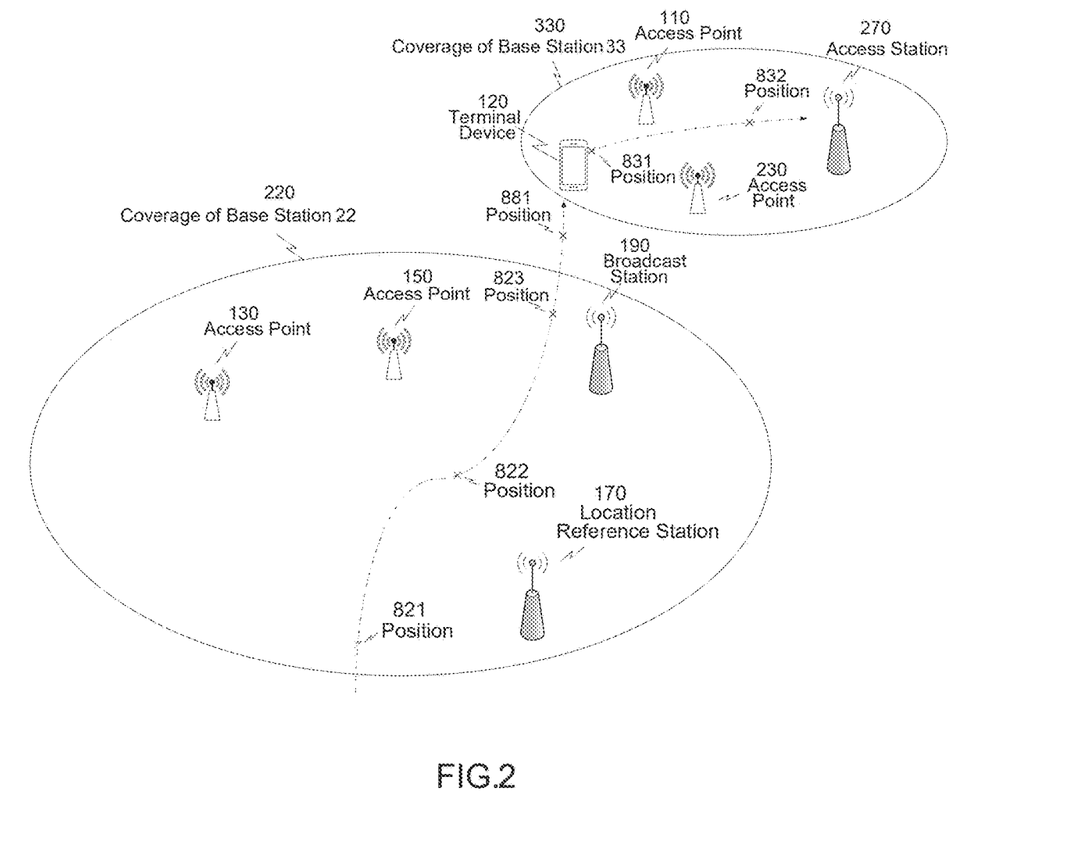
FIG. 2 illustrates an exemplary position change of an access point, according to some embodiments of the disclosure.

FIG. 2 illustrates an exemplary position change of an access point, according to some embodiments of the disclosure. As shown in FIG. 2, WI-FI AP 110 may be moved to another position within coverage 330 of a cellular base station 33 (not shown). For example, when terminal device 120 moves to position 831 and needs to obtain its current position, it may scan for access stations around itself and obtain a list of scanned access stations, including base station 33 (not shown) and WI-FI APs 110, 230. Terminal device 120 at position 831 may select and connect to WI-FI AP 110 because WI-FI AP 110 is accessible and provides the best communication signals.

If terminal device 120 decides to determine whether WI-FI AP 110 has been relocated, terminal device 120 may check whether the list of scanned access stations also includes a reference access station associated with WI-FI AP 110. For example, terminal device 120 at position 831 may examine the current list of scanned access station based on the association between WI-FI AP 110 and base station 22. According to the association, terminal device 120 may check whether base station 22 is also included in the current list of scanned access stations at position 831. In this case, terminal device 120 may find that the associated base station 22 is not included in the current list of scanned access stations at position 831. Accordingly, terminal device 120 may determine WI-FI AP 110 has been relocated. As such, terminal device 120 may disregard WI-FI AP 110 in positioning the terminal device, and/or proceed to ascertain the true position of WI-FI AP 110. For example, terminal device 120 may exclude WI-FI AP 110 from the current list of scanned access stations at position 831, and position terminal device 120 based on the remaining access stations in the list, i.e., base station 33 and WI-FI AP 230.

In some embodiments, the association between an access point and a reference access station may be established by using association-rule based machine learning to discern geographic relations between two wireless devices. For example, a large amount of historical data showing the geographic distribution of access points in a predefined area may be analyzed to discover geographically associated access points, i.e., access points that statistically co-exist in the same predefined area. The historical data may include data collected by multiple terminal devices over a period of time, such as, 1 week, 1 month, etc. For example, terminal devices installed with certain positioning application may periodically scan the surrounding access points and report the geographic distribution of the scanned access points to a back-end server.

The back-end server may combine and analyze the received historical data indicative of the geographic distributions of access points in the predefined area, to extract geographically associated or geographically co-occurring access points. In particular, the server may run an association-rule mining algorithm, such as a priori algorithm, FP-Growth algorithm, etc., to study the frequency of co-occurrence of two access points in the historical data. If, for example, the server learns that the co-occurring frequency of two access points, in the geographic destitutions of access points reported by multiple terminal devices over a predetermined time period, exceeds a threshold, the server may consider the two access points are associated.

In some embodiments, wireless devices in the same wireless local-area network are given the same service set identifier (SSID). Thus, wireless devices with the same SSID may be considered as geographically associated, i.e., in the same geographic area. Accordingly, association may be established when the access point and a reference access station use the same SSID. For example, referring to FIG. 1, terminal device 120 may establish association between WI-FI AP 110 and WI-FI AP 130 when WI-FI AP 110 and WI-FT AP 130 both use the same SSID, such as DiDi Guest. For example, terminal device 120 may scan WI-FI AP 110 at position 821 and store the SSID "DiDi Guest" used by WI-FI AP 110. Terminal device 120 may also scan WI-FI AP 130 at position 822 and store the SSID "DiDi Guest" used by WI-FI AP 130. Terminal device 120 may find that WI-FI APs 110, 130 use the same SSID, i.e. DiDi Guest. Accordingly, terminal device 120 may establish association between WI-FI AP 110 and WI-FI AP 130 because the two WI-FI APs use the same SSID.

In this case, when WI-FI AP 110 is relocated as shown in FIG. 2, terminal device 120 at position 831 may detect the position change of WI-FI AP 110 according to the association between WI-FI AP 110 and WI-FI AP 130. Since the list of scanned access stations at position 831 may include base station 33 and WI-FI APs 110 and 230, but not include the associated WI-FI AP 130 that uses the same SSID as the connected WI-FI AP 110, terminal device 120 may detect the position change of WI-FI AP 110 accordingly.

In some embodiments, the association may be established when the MAC addresses of both the access point and a reference access station belong to a predetermined group of MAC addresses. For example, terminal device 120 may establish association between WI-FI AP 110 and WI-FI AP 130 when the MAC addresses of WI-FI AP 110 and WI-FI AP 130 both belong to a predefined group.

A MAC address may include 48 bits. The first 24 bits may be managed by an IEEE registration agent. A manufacturer of network devices or a network service provider may apply its unit organizationally unique identifier (OUI) from the IEEE registration agent. The manufacturer/provider may use the unique OUI combining with 24-bit sequential numbers as MAC addresses of its network products. When a customer buys a group of WI-FI APs from the manufacture/provider and installs the WI-FI APs in a specific area, e.g., an office building, a factory, a shopping mall, etc., the MAC addresses of the group of WI-FI APs often share the same OUI and similar sequential numbers. For example, the difference between sequential numbers of WI-FI APs installed at the customer's premises may be only in the last two digits. As such, MAC addresses with similar MAC addresses may be considered as geographically associated.

For example, referring to FIG. 1, terminal device 120 may scan WI-FI AP 110 at position 821 and store the MAC address of WI-FI AP 110. Terminal device may also scan WI-FI AP 130 at position 822 and store the MAC address of WI-FI AP 130. Terminal device 120 may find WI-FI APs 110 and 130 have similar MAC addresses, e.g., MAC addresses only differing in the last one or two digits, and may establish the association between WI-FI AP 110 and WI-FI AP 130. In this case, when WI-FI AP 110 is relocated as shown in FIG. 2, terminal device 120 at position 831 may detect the position change of WI-FI AP 110 according to the association between WI-FI AP 110 and WI-FI AP 130. That is, since the list of scanned access stations at position 831 may include base station 33 and WI-FI APs 110 and 230, but not include the associated WI-FI AP 130, terminal device 120 may detect the position change of WI-FI AP 110 accordingly.

In some embodiments, although multiple WI-FI APs and/or other network devices have non-similar MAC addresses, but are known to be installed in the same premises, the MAC address of these APs/devices can be grouped together and stored in a server. Terminal device 120 may obtain information about the predetermined group of MAC addresses by querying the server, and determine WI-FI APs or network devices with MAC addresses in the predetermined group are geographically associated.

In some embodiments, terminal device 120 may further include a positioning module that may detect its current position. For example, terminal device 120 may include a GPS positioning module that may receive GPS signals from satellites. Based on the GPS signals, terminal device 120 may obtain its estimated GPS position. Terminal device 120 may also obtain a position of a scanned access point from a server. Accordingly, terminal device 120 may determine the position of the access point has changed when the estimated GPS position of terminal device 120 and the received position of the scanned access point is not within a predetermined distance.

For example, referring to FIGS. 1-2, terminal device 120 at position 822 may obtain its GPS position via its GPS positioning module. Terminal device 120 may also query the position of the connected WI-FI AP 110 from a WI-FI AP position server. Terminal device 120 may compare its estimated GPS position with the received position of WI-FI AP 110. If the two positions are within a threshold distance, e.g., 20 meters, terminal device may determine the position of WI-FI AP 110 has not changed. However, if the distance between the estimated GPS position of terminal device 120 and the received position of WI-FI AP 110 is larger than the threshold distance, e.g., 20 meters, terminal device 120 may determine the position of WI-FI AP 110 has not changed.

When terminal device 120 locates at position 822 in FIG. 1, it may determine the position of WI-FI AP 110 has not changed when its estimated GPS position approximates to the received the GPS position of WI-FI AP 110. When WI-FI AP 110 is relocated as shown in FIG. 2, terminal device 120 at position 831 may detect the distance between the estimated GPS position of terminal device 120 and the received GPS position of WI-FI AP 110 is larger than the threshold distance, e.g., 20 meters, and thus determine the position of WI-FI AP 110 has changed.

In some embodiments, terminal device 120 may also send its estimated GPS position and identity of WI-FT AP 110 to a WI-FI AP position server. For example, when terminal device 120 at position 831 detects the position change of WI-FT AP 110, it may send its estimated GPS position and identity of WI-FI AP 110, such as the MAC address, to the WI-FI AP position server. The server may update the position of WI-FI AP 110 according to the estimated GPS position of terminal device 120. That will be helpful for using WI-FI AP 110 in positioning thereafter.

In some embodiments, terminal device 120 may further obtain the position of the reference access stations from the server. For example, referring to FIG. 2, if WI-FI AP 110 is associated with WI-FI AP 130, when terminal device 120 is at position 831, connecting to WI-F AP 110, terminal device 120 may further obtain the position of WI-FI AP 130 from a WI-FI AP position server. Terminal device 120 at position 831 may compare its estimated GPS position and the received GPS position of WI-FI AP 130. When terminal device 120 find that the distance between its estimated GPS position at 831 and the received GPS position of WI-FI AP 130 is larger than another threshold, e.g., 35 meters, it may detect the position change of WI-FI AP 110 accordingly.

In some embodiments, terminal device 120 may disregard a connected access point in positioning terminal device 120 if the position change of the connected access point is detected. For example, still referring to FIG. 2, terminal device 120 at position 831, connecting to WI-FI AP 110, may detect the position change of WI-FI AP 110. Terminal device 120 may disregard WI-FT AP 110 in positioning terminal device 120, and may instead use other scanned APs for positioning terminal device 120. For example, terminal device 120 at position 831 may also have WI-FI AP 230 on its list of scanned access stations. Terminal device 120 may obtain the position of WI-FI AP 231 from the server and may use the received position as its current position.

In some embodiments, the association in any one of above embodiments may be determined and/or stored in a server, e.g., the WI-FI AP position server. Terminal device 120 may obtain the association from the server. In some embodiments, the operations of detecting the position change of an access point in any one of above embodiments may be performed by a server, e.g., the WI-FI AP position server. Terminal device 120 may obtain the detection result from the server. In some embodiments, the operations of disregarding the access point in positioning the terminal device when the position change of the access point is detected may be performed by a server, e.g., the WI-FI AP position server. Terminal device 120 may obtain the result from the server. In some embodiments, the operations of selecting another scanned assess station and updating the access point to be associated with the selected access station may be performed by a server, e.g., the WI-FI AP position server. Terminal device 120 may obtain the updated association from the server.

Figure 3:
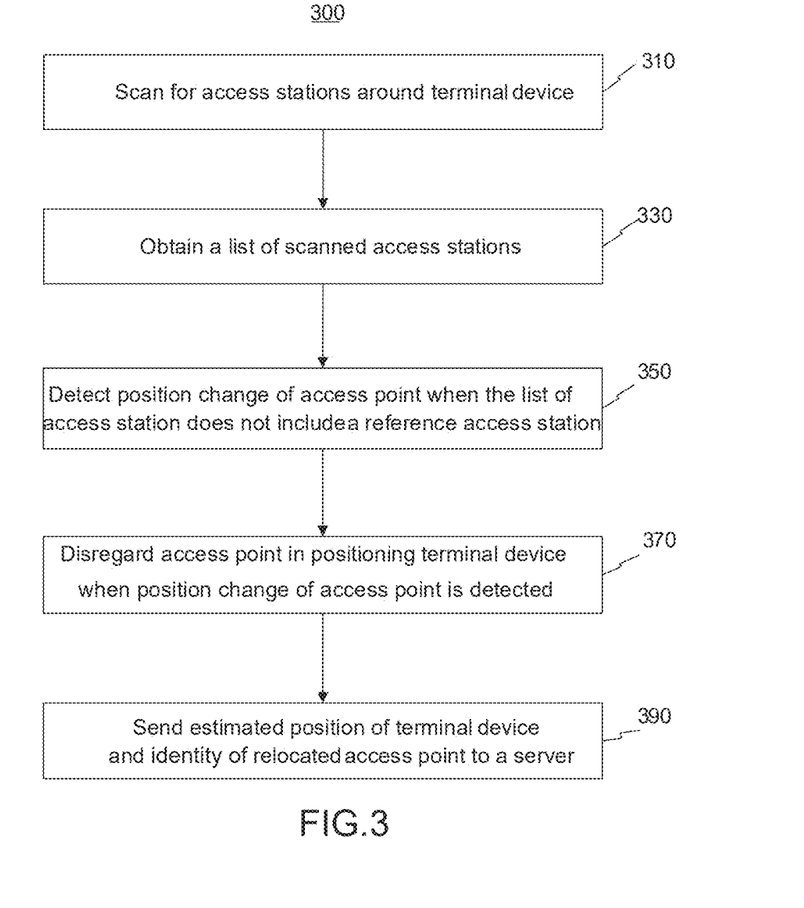
FIG. 3 is a flowchart of an exemplary method for detecting position change of an access point, according to some embodiments of the disclosure.

FIG. 3 is a flowchart of an exemplary method 300 for detecting position change of an access point, according to some embodiments of the disclosure. Consistent with the disclosed embodiments, some or all of the steps in method 300 may be performed by a terminal device, a server, or a combination thereof.

Step 310 may include scanning for access stations around a terminal device. For example, terminal device 120 at positions 821, 822, 823, 881 in FIG. 1 and positions 831, 832 in FIG. 2 may scan for access stations by using its communication modules, as described above.

Step 330 may include obtaining a list of scanned access stations. After scanning for access stations, terminal device 120 may obtain a list of scanned access stations. For example, terminal device 120 at position 821 may obtain a list of scanned access stations, including base station 22, WI-FI AP 110 and location reference station 170. Terminal device 120 at position 822 may obtain another list of scanned access stations, including base station 22, WI-FI APs 110, 130, 150, location reference station 170, and broadcast station 190. Terminal device 120 at position 823 may obtain another list of scanned access stations, including base station 22, WI-FI AP 150, and broadcast station 190. Terminal device 120 at position 881 may obtain another list of scanned access stations, including only broadcast station 190. Terminal device 120 at position 831 may obtain another list of scanned access stations, including base station 33 and WI-FI APs 110, 230. Terminal device 120 at position 832 may obtain another list of scanned access stations, including base station 33, WI-FI APs 110, 230, and access station 270.

Step 350 may include detecting position change of an access point when the list of access stations does not include a reference access station associated with the access point. For example, referring to FIG. 2, terminal device 120 at position 831 may check its current list of scanned access stations based on the association between WI-FI AP 110 and base station 22. According to the association, terminal device 120 may check whether base station 22 is included in the current list of scanned access stations at position 831. Terminal device 120 may find that the associated base station 22 is not included in the current list of scanned access stations at position 831 because position 831 is not in coverage 220 of base station 22. Accordingly, terminal device 120 may detect the position of WI-FI AP 110 has changed.

In another example, terminal device 120 may establish association between WI-FI AP 110 and WI-FI AP 150. When WI-FI AP 110 is relocated as shown in FIG. 2, terminal device 120 at position 831 may detect the position change of WI-FI AP 110 according to the association between WI-FI AP 110 and WI-FI AP 150. That is, since the list of scanned access stations at position 831 may include base station 33 and WI-FI APs 110 and 230, but not include the associated WI-FI AP 150, terminal device 120 may detect the position change of WI-FI AP 110 accordingly.

In Step 370, the relocated access point may be disregarded in positioning the terminal device when the position change of the access point is detected. For example, terminal device 120 at position 831, connecting to WI-FI AP 110 in FIG. 2, may detect the position change of WI-FI AP 110. Accordingly, terminal device 120 may disregard WI-FI AP 110 in positioning terminal device 120 itself. In one embodiment, terminal device 120 may exclude WI-FT AP 110 from the current list of scanned access stations at position 831, and position terminal device 120 based on the remaining access stations in the list.

Step 390 may include sending the estimated position of the terminal device and identity of the relocated access point to a server. For example, when terminal device 120 at position 831 detects the position change of WI-FI AP 110, terminal device 120 may send GPS position of terminal device 120 and identity of WI-FI AP 110, such as the MAC address, to a WI-FI AP position server. The WI-FI AP position server may update the position of WI-FI AP 110 based on the GPS position of terminal device 120.

Figure 4:
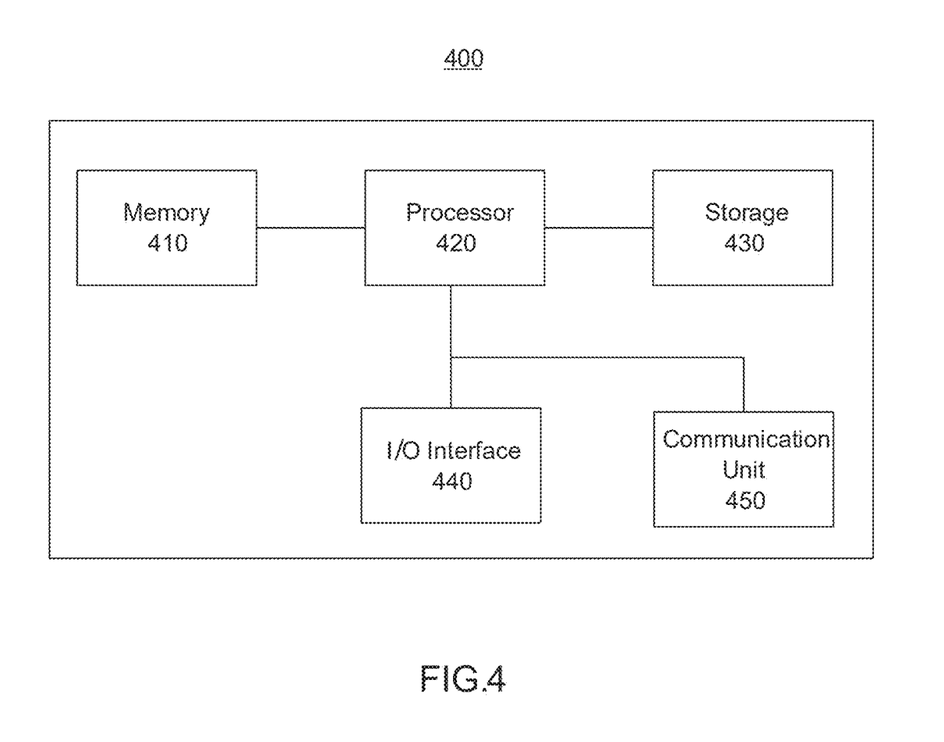
FIG. 4 illustrates a block diagram of an exemplary device for detecting position change of an access point, according to some embodiments of the disclosure.

FIG. 4 illustrates a block diagram of an exemplary device 400 for detecting position change of an access point, according to some embodiments of the disclosure. Consistent with the present disclosure, device 400 may be a terminal device, such as terminal device 120, or a server, such as a WI-FI AP position server. For illustrative purpose only, the following description presumes device 400 is a terminal device, i.e., terminal device 400. However, it is contemplated that the structures described herein can also be adopted by a server for practicing the disclosed methods.

Device 400 may include a memory 410, a processor 420, a storage 430, an I/O interface 440, and a communication unit 450. One or more of the components of device 400 may be included for detecting position change of an access station. These units may be configured to transfer data and send or receive instructions between or among each other.

Processor 420 may include any appropriate type of general-purpose or special-purpose microprocessor, digital signal processor, or microcontroller. Processor 420 may be configured to scan for access stations around device 400. For example, referring to FIGS. 1-2, processor 420 may be configured to control communication unit 450 to scan access stations around terminal apparatus 400 at positions 821, 822, 823, 881, 831, 832.

Processor 420 may be configured to obtain a list of scanned access stations. After scanning for access stations, processor 420 may obtain a list of scanned access stations. For example, referring to FIG. 1, process 420 may obtain a list of scanned access stations, including base station 22, WI-FI APs 110, 130, 150, location reference station 170, and broadcast station 190 while device 400 locates at position 822. For another example, processor 402 may obtain another list of scanned access stations, including base station 33 and WI-FI APs 110, 230 while device 400 locates at position 831. Processor 420 may be configured to store the list of scanned access stations in memory 410 and/or storage 430.

Processor 420 may be configured to detect position change of an access point when the access point and a reference access station or access point associated with the access point do not co-exist in the same list of access stations. For example, referring to FIG. 2, processor 420 accesses memory 410 and/or storage 430 to check its current list of scanned access stations based on the association between WI-FT AP 110 and base station 22 while device 400 locates at position 831. According to the association, processor 420 may check whether base station 22 is included in the current list of scanned access stations at position 831. Processor 420 may find that the associated base station 22 is not included in the current list of scanned access stations at position 831 because position 831 is not in coverage 220 of base station 22. Accordingly, processor 420 may determine the position of WI-FI AP 110 has changed.

Processor 420 may be configured to disregard the access point in positioning device 400 when the position change of the access point is detected. For example, processor 420, connecting to WI-FI AP 110 in FIG. 2 through communication 450, may detect the position change of WI-FT AP 110 while device 400 locates at position 831. Accordingly, processor 420 may disregard WI-FI AP 110 in positioning device 400.

Processor 420 may be configured to send the estimated position of device 400 and identity of the relocated access point to a server. For example, referring to FIG. 2, when processor 420 detects the position change of WI-FI AP 110 at position 831, it may send the current GPS position of device 400 and identity of WI-FI AP 110, such as the MAC address, to a WI-FI AP position server by communication unit 450.

Processor 420 may execute computer instructions (program codes) stored in memory 410 and/or storage 430, and may perform functions in accordance with exemplary embodiments described in this disclosure.

Memory 410 and storage 430 may include any appropriate type of mass storage provided to store any type of information that processor 420 may need to operate. Memory 410 and storage 430 may be a volatile or non-volatile, magnetic, semiconductor, tape, optical, removable, non-removable, or other type of storage device or tangible (i.e., non-transitory) computer-readable medium including, but not limited to, a read-only memory (ROM), a flash memory, a dynamic random-access memory (RAM), and a static RAM. Memory 410 and/or storage 430 may be configured to store one or more computer programs that may be executed by processor 420 to perform exemplary detecting position change of an access point disclosed in this application. For example, referring to FIG. 2, memory 410 and/or storage 430 may be configured to store program(s) that may be executed by processor 420 to detect position change of WI-FI AP 110 at position 831, as described above.

Memory 410 and/or storage 430 may be further configured to store information and data used by processor 420. For instance, memory 410 and/or storage 430 may be configured to store the lists of scanned access stations at different positions, association between access points and reference access stations, access points having position change, GPS positions of device 400, and received GPS positions of WI-FI APs.

I/O interface 440 may be configured to facilitate the communication between device 400 and other apparatuses. For example, I/O interface 440 may receive a signal from another apparatus (e.g., a computer) that indicates the association between WI-FI APs and reference access stations, and transmits the signal to processor 420 for further processing. I/O interface 440 may also output data of scanned access stations to other apparatuses (e.g., a laptop computer or a WI-FI AP position server) for updating the positions of WI-FI APs while detecting the position change.

Communication unit 450 may include one or more cellular communication modules, including, for example, a Long-Term Evolution (LTE), a High Speed Packet Access (HSPA), a Wideband Code-Division Multiple Access (WCDMA), and/or a Global System for Mobile communication (GSM) communication module. For example, referring to FIG. 1, via the cellular communication module of communication unit 450, processor 420 may scan and detect a cellular base station 22 because device 400 at position 822 is within coverage 220 of base station 22. Communication unit 450 may also include a wireless local area network (WLAN) module, such as a WI-FI communication module. For example, still referring to FIG. 1, by using the WI-FI communication module of communication unit 450, processor 420 may scan and detect WI-FI APs 110, 130, 150 at position 822. In some embodiments, communication unit 450 may also include a location reference communication module that may scan location reference stations and use their positions as references. For example, still referring to FIG. 1, processor 420 may detect location reference station 170 at position 811 by using the location reference communication module of communication unit 450. In some embodiments, communication unit 450 may also include a broadcast communication module that may scan broadcast stations, such as local radios by Frequency Modulation (FM) or Amplitude Modulation (AM) broadcasting. For example, still referring to FIG. 1, through the broadcast communication module of communication unit 450, processor 420 may scan and detect broadcast station 190 at position 822.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed apparatuses and related methods for detecting position change of an access point. Other embodiments will be apparent to those skilled in the art from consideration of the specification and practice of the disclosed apparatuses and related methods for detecting position change of an access point. Although the embodiments are described using WI-FI access point as an example, the described apparatuses and methods can be applied to detect position change of other access stations. For example, the described apparatuses and methods may be used to detect position change of a femto access point, an LTE home eNB, an iBeacon station, a broadcast station, a location reference station, etc.

It is intended that the specification and examples be considered as exemplary only, with a true scope being indicated by the following claims and their equivalents.

What is claimed is:

1. A computer-implemented method for detecting position change of an access point, the method comprising:
   obtaining a list of access stations scanned by a terminal device, wherein the list of scanned access stations includes the access point; and
   detecting the position change of the access point when the list of scanned access stations does not include a reference access station in association with the access point.

2. The computer-implemented method of claim 1, wherein the reference access station includes at least one of a cellular base station, another access point, or a location reference station.

3. The computer-implemented method of claim 1, further comprising:
   acquiring data representing a plurality of distributions of access stations;
   determining co-occurring frequencies of the access stations in the plurality of distributions; and
   establishing the association between the access point and the reference access station based on the co-occurring frequencies.

4. The computer-implemented method of claim 3, wherein the co-occurring frequencies are determined based on an association-rule analysis of the plurality of distributions.

5. The computer-implemented method of claim 1, wherein the association is established when the access point and the reference access station use the same service set identifier (SSID).

6. The computer-implemented method of claim 1, wherein the association is established when media access control (MAC) addresses of both the access point and the reference access station belong to a predetermined group of MAC addresses.

7. The computer-implemented method of claim 1, further comprising:
   obtaining an estimated position of the terminal device; and
   obtaining a position of the access point from a server,
   wherein the detecting the position change of the access point includes detecting the position change of the access point when the estimated position of the terminal device and the obtained position of the access point from the server is not within a threshold distance.

8. The computer-implemented method of claim 7, further comprising: sending the estimated position of the terminal device and identity of the access point to the server.

9. The computer-implemented method of claim 1, further comprising:
   excluding the access point from the list of access stations scanned by the terminal device when the position change of the access point is detected; and
   positioning the terminal device based on the remaining access stations scanned by the terminal device.

10. A device for detecting position change of an access point, the device comprising:
    a memory including instructions; and
    at least one processor configured to execute the instructions to:
    obtain a list of access stations scanned by a terminal device, wherein the list of scanned access stations includes the access point; and
    detect the position change of the access point when the list of scanned access stations does not include a reference access station in association with the access point.

11. The device of claim 10, wherein the reference access station includes at least one of a cellular base station, another access point, or a location reference station.

12. The device of claim 10, wherein the at least one processor is further configured to execute the instructions to:
acquire data representing a plurality of distributions of access stations;
determine co-occurring frequencies of the access stations in the plurality of distributions; and
establish the association between the access point and the reference access station based on the co-occurring frequencies.

13. The device of claim 12, wherein the at least one processor is further configured to execute the instructions to:
determine the co-occurring frequencies by performing an association-rule analysis of the plurality of distributions.

14. The device of claim 10, wherein the association is established when the access point and the reference access station use the same service set identifier (SSID).

15. The device of claim 10, wherein the association is established when media access control (MAC) addresses of both the access point and the reference access station belong to a predetermined group of MAC addresses.

16. A non-transitory computer-readable medium that stores a set of instructions, when executed by at least one processor, cause the at least one processor to perform a method for detecting position change of an access point, the method comprising:
obtaining a list of access stations scanned by a terminal device, wherein the list of scanned access stations includes the access point; and
detecting the position change of the access point when the list of scanned access stations does not include a reference access station in association with the access point.

17. The non-transitory computer-readable medium of claim 16, wherein the method further comprises:
acquiring data representing a plurality of distributions of access stations;
determining co-occurring frequencies of the access stations in the plurality of distributions; and
establishing the association between the access point and the reference access station based on the co-occurring frequencies.

18. The non-transitory computer-readable medium of claim 17, wherein the co-occurring frequencies are determined based on an association-rule analysis of the plurality of distributions.

19. The non-transitory computer-readable medium of claim 16, wherein the association is established when the access point and the reference access station use the same service set identifier (SSID).

20. The non-transitory computer-readable medium of claim 16, wherein the association is established when media access control (MAC) addresses of both the access point and the reference access station belong to a predetermined group of MAC addresses.

* * * * *